(12) United States Patent
Mohammed et al.

(10) Patent No.: US 9,860,130 B2
(45) Date of Patent: Jan. 2, 2018

(54) METHODS, APPARATUSES, SYSTEM, RELATED COMPUTER PROGRAM PRODUCT FOR ROUTING AND PROCESSING POLICY REQUESTS RELATED TO GROUP SUBSCRIPTION

(71) Applicant: NOKIA SOLUTIONS AND NETWORKS OY, Espoo (FI)

(72) Inventors: Ashid Mohammed, Bangalore (IN); Abhishek Mishra, Bangalore (IN); Raghuvamshi Thakur, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 168 days.

(21) Appl. No.: 14/435,567

(22) PCT Filed: Oct. 22, 2012

(86) PCT No.: PCT/EP2012/070886
§ 371 (c)(1),
(2) Date: Apr. 14, 2015

(87) PCT Pub. No.: WO2014/063723
PCT Pub. Date: May 1, 2014

(65) Prior Publication Data
US 2015/0236915 A1   Aug. 20, 2015

(51) Int. Cl.
*H04L 12/24* (2006.01)
*H04L 29/08* (2006.01)

(52) U.S. Cl.
CPC ......... *H04L 41/0893* (2013.01); *H04L 67/30* (2013.01)

(58) Field of Classification Search
CPC ..... H04L 12/14; H04L 12/1403; H04W 12/06
See application file for complete search history.

(56) References Cited

U.S. PATENT DOCUMENTS

2011/0158090 A1* 6/2011 Riley ............... H04L 12/14
370/230
2011/0320622 A1* 12/2011 Cutler ............... H04L 12/14
709/230

FOREIGN PATENT DOCUMENTS

CN   101288270 A   10/2008
CN   101729978 A   6/2010

OTHER PUBLICATIONS

International Search Report and Written Opinion dated Aug. 9, 2013 corresponding to International Patent Application No. PCT/EP2012/070886.

(Continued)

*Primary Examiner* — Ranodhi Serrao
(74) *Attorney, Agent, or Firm* — Squire Patton Boggs (US) LLP

(57) ABSTRACT

Methods, apparatuses, system and a related computer program product for processing policy requests are disclosed. The method comprises receiving (410) a policy request for establishment of a session for a subscriber; determining (420) if the subscriber belongs to a group subscription; verifying (430) if a binding exists between at least one policy engine among a plurality of policy engines and the group subscription, if the subscriber belongs to the group subscription; and routing (440) the policy request to the at least one policy engine based on the binding for processing the policy request if the result of verification is positive.

10 Claims, 16 Drawing Sheets

(56) References Cited

OTHER PUBLICATIONS

Huawei et al., "Enforcing Group Level Policy," SA WG2 Meeting #93, 3GPP Draft; S2-123648, Oct. 8-12, 2012, Sofia, Bulgaria, Oct. 2, 2012, XP050683376, 4 pages.
Motorola, "Clarifying the Role of PCRF and SPR," 3GPP TSG-SA WG2 Meeting #55, 3GPP Draft; S2-063896, Oct. 23-27, 2006, Busan, South Korea, Oct. 17, 2006, XP050627004, 10 pages.
Chinese Office Action corresponding to Chinese Patent Appln. No. 201280076563.8, dated Mar. 27, 2017.

* cited by examiner

METHODS, APPARATUSES, SYSTEM, RELATED COMPUTER PROGRAM PRODUCT FOR ROUTING AND PROCESSING POLICY REQUESTS RELATED TO GROUP SUBSCRIPTION

FIELD OF THE INVENTION

The present invention relates to policy procedures in communication networks. More specifically, the present invention relates to methods, apparatuses, a system, a related computer program product for routing and processing policy requests related to group subscription in communication networks.

BACKGROUND

Policy engines are used in communication networks to enforce operator defined policies as may be related to gating control, Quality of Service (QoS) control, QoS signaling etc. Examples of such policy engines are the Policy Charging and Rules Function (PCRF) in mobile networks as defined by the $3^{rd}$ generation partnership program (3GPP), the Serving Policy Decision Function (SPDF) in fixed networks and the Packet Cable Policy Server in cable networks.

In communication networks, it is desirable that a plurality of policy engines is deployed. When a plurality of policy engines are present in a communication network, discovery procedures for policy engines are needed to direct requests from network elements to policy engines. Such discovery procedures should also ensure that requests from various network elements are directed the same policy engine throughout a session.

One solution to efficiently perform the discovery procedure is to deploy a policy request router, such as a Diameter Routing Agent (DRA) defined by the 3GPP. The policy request router is a functional element that ensures that all policy related messages in a session of a certain subscriber reach the same policy engine when multiple and separately addressable policy engines have been deployed. The policy request router maintains the policy engine routing information during the session and removes such information once the session is terminated.

Policy engines can control policies for a group subscription which may comprise a plurality of subscribers. If policy related requests for sessions of different subscribers within a group are directed to different policy engines, policies related to group subscription cannot be enforced efficiently, since data inconsistencies may occur and it may necessitate additional signaling in order to avoid the data inconsistencies. These problems may arise because subscription, provisioning and/or usage related information for the group may be cached differently in the different policy engines.

SUMMARY

In consideration of the above, it is an object of examples of the present invention to overcome one or more of the above drawbacks. In particular, the present invention provides methods, apparatuses, a system, and a related computer program product for routing and processing policy requests related to group subscription in communication networks.

According to a first aspect of the invention, there is provided a method comprising: receiving a policy request for establishment of a session for a subscriber; determining if the subscriber belongs to a group subscription; verifying if a binding exists between at least one policy engine among a plurality of policy engines and the group subscription, if the subscriber belongs to the group subscription; and routing the policy request to the at least one policy engine based on the binding for processing the policy request if the result of verification is positive. The method may further comprise selecting any one policy engine among the plurality of policy engines for processing the request if the result of verification is negative; and creating a binding between the selected any one policy engine and the group subscription.

According to another embodiment, there is provided a method comprising: receiving a first policy request for initiating a session of a subscriber belonging to a group subscription; verifying if a profile of the group subscription is stored in a local cache; and processing the first policy request for the session of the subscriber based on the stored profile, if the result of the verification is positive. The method may further comprise retrieving a profile of the group subscription from a subscriber profile repository if the result of the verification is negative; and storing the profile in the local cache.

The method may further comprise receiving a second policy request during the session indicating a quantity of units consumed during a segment of the session; and updating the profile stored in the local cache based on the indication.

The method may further comprise receiving a third policy request indicating a termination of the session of the subscriber and a quantity of units consumed during a terminating segment of the session; verifying if a session is ongoing for any other subscriber belonging to the group subscription; and updating the profile stored in the local cache based on the quantity of units consumed during the terminating segment of the session if the result of verifying is positive. The method may further comprise sending a message comprising the updated profile to the subscriber profile repository, if the result of the verification is negative.

According to a second aspect of the invention, there is provided an apparatus comprising: means for receiving a policy request for establishment of a session for a subscriber; means for determining if the subscriber belongs to a group subscription; means for verifying if a binding exists between at least one policy engine among a plurality of policy engines and the group subscription, if the subscriber belongs to the group subscription; and means for routing the policy request to the at least one policy engine based on the binding for processing the policy request if the result of verification is positive.

The apparatus may further comprise means for selecting any one policy engine among the plurality of policy engines for processing the request if the result of verification is negative; and means for creating a binding between the selected any one policy engine and the group subscription.

According to another embodiment, there is provided an apparatus comprising: means for receiving a policy request for a session of a subscriber belonging to a group subscription; means for verifying if a profile of the group subscription is stored in a local cache; and means for processing the policy request for the session of the subscriber based on the stored profile, if the result of the verification is positive. The apparatus may further comprise means for retrieving a profile of the group subscription if the result of the verification is negative.

According to a third aspect of the invention, there is provided a system comprising the apparatuses of the second aspect.

According to a fourth aspect of the invention, there is provided a computer program product comprising code portions for causing an apparatus on which the computer program is executed to carry out the method according to the first aspect.

Embodiments of the present invention may have one or more of following advantages:

Policy procedures for group subscription can be supported efficiently at policy engines without the need for querying a subscriber profile repository for every transaction;

Data inconsistency due to processing of policy requests for a group subscription by different policy engines can be completely eliminated;

The procedures of the invention can be scaled to any number of groups and any number of subscribers per group;

Procedures of the invention do not need a group identity in the policy requests.

DETAILED DESCRIPTION OF THE PRESENT INVENTION

Examples of the present invention are described herein below by way of example with reference to the accompanying drawings.

Figure 1:
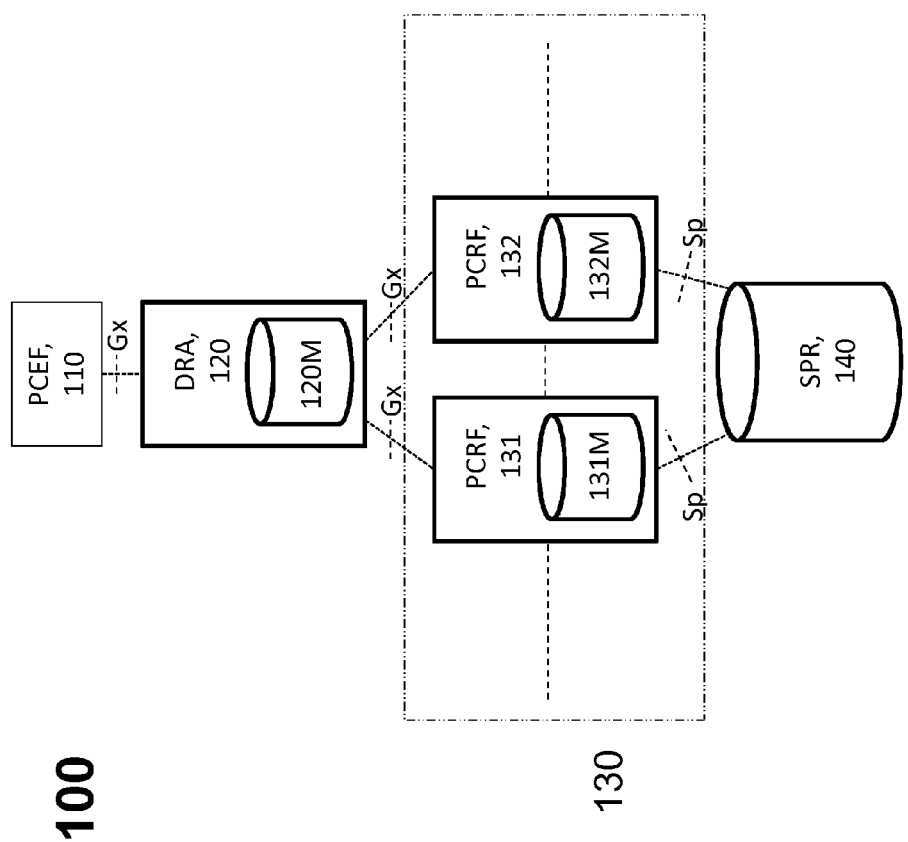
FIG. 1 shows an architecture of a system wherein the procedures according to embodiments of the invention can be carried out.

FIG. 1 shows architecture of a system according to an example of the present invention. The system may comprise:

One or more network nodes 110 such as gateways (e.g., Gateway General Packet Radio Service (GPRS) support node (GGSN), packet data network PDN gateway (GW) P-GW, Service Architecture Evolution (SAE) gateway (GW) etc) and application functions (e.g., proxy call session control function (P-CSCF)); the network nodes 110 may provide the function of a policy enforcement function (PCEF);

One or more policy request routers 120 that may act as a policy handling front end for the network nodes, i.e., an actual policy engine may be hidden to the network nodes; the policy request routers 120 may have a local cache 120M for storing information related to subscribers, sessions and policy engines;

A plurality of policy engines 130 (131, 132 etc) that may actually handle policy requests from the network nodes 110; examples of such policy engines 130 are a Policy Charging and Rules Function (PCRF) defined by the 3GPP, a Serving Policy Decision Function (SPDF) in fixed networks and a Packet Cable Policy Server in cable networks; each of these policy engines may also have individual local cache 131M, 132M etc for storing information related to subscribers and sessions;

One or more subscriber profile repositories (SPRs) 140 that may store subscriber data, session data and any other information that may be useful for policy evaluation by policy engines.

A network node 110 may exchange messages with a policy request router 120 over a Diameter interface. For example, a GGSN 110 may have a Gx interface (defined by the 3GPP) with a policy request router 120 and an application function such as a P-CSCF may have a Rx interface defined by the 3GPP with the policy request router 120. Example of a message exchanged between the network node 110 and the policy request router 120 may be a Diameter credit control request (CCR) message and a Diameter credit control answer (CCA) message. These messages may be exchanged during the initiation, delivery or termination of a session. Depending on this, the messages may be a CCR-I (initial), CCR-U (update) or CCR-T (termination) or a corresponding CCA message. The session can be an Internet protocol (IP)—connectivity access network (CAN) session.

In case of a plurality of policy request routers 120 (not shown in FIG. 1), they may be interconnected with each other over Ethernet and may be deployed in a secure network. The interconnection may facilitate sharing of information between the routers. The sharing of information may be using a transport layer protocol such as user datagram protocol (UDP) dispatcher.

A policy request router 120 may exchange messages with a policy engine 130 using any transport layer protocol such as Diameter. The policy request router 120 may act either as a proxy or as a redirecting agent. The policy request router 120 may enhance a policy request message received from a network node 110 before sending the message to a policy engine 130. Such enhancement may comprise adding subscriber data to the policy request message to aid policy engine 130 in retrieving relevant session data. Additionally, the policy request router 120 may specify a time period by which a response is expected and also request the policy engine 120 to report out its current load condition for load management purposes. Thus, a policy request router 120 may provide other functions in addition to the routing function.

The policy engines 130 may be interconnected to each other over Ethernet and may be deployed in a secure network. They may exchange information such as session data using a transport layer protocol such as Diameter.

The subscriber profile repository (SPR) 140 can be any repository that may store subscriber data. For example, the SPR may be a home location register (HLR), home subscriber server (HSS) or a X.500 directory database. Interface between the subscriber profile repository 140 and the policy engines 130 may be a Sp interface defined by 3GPP.

Figure 2A:
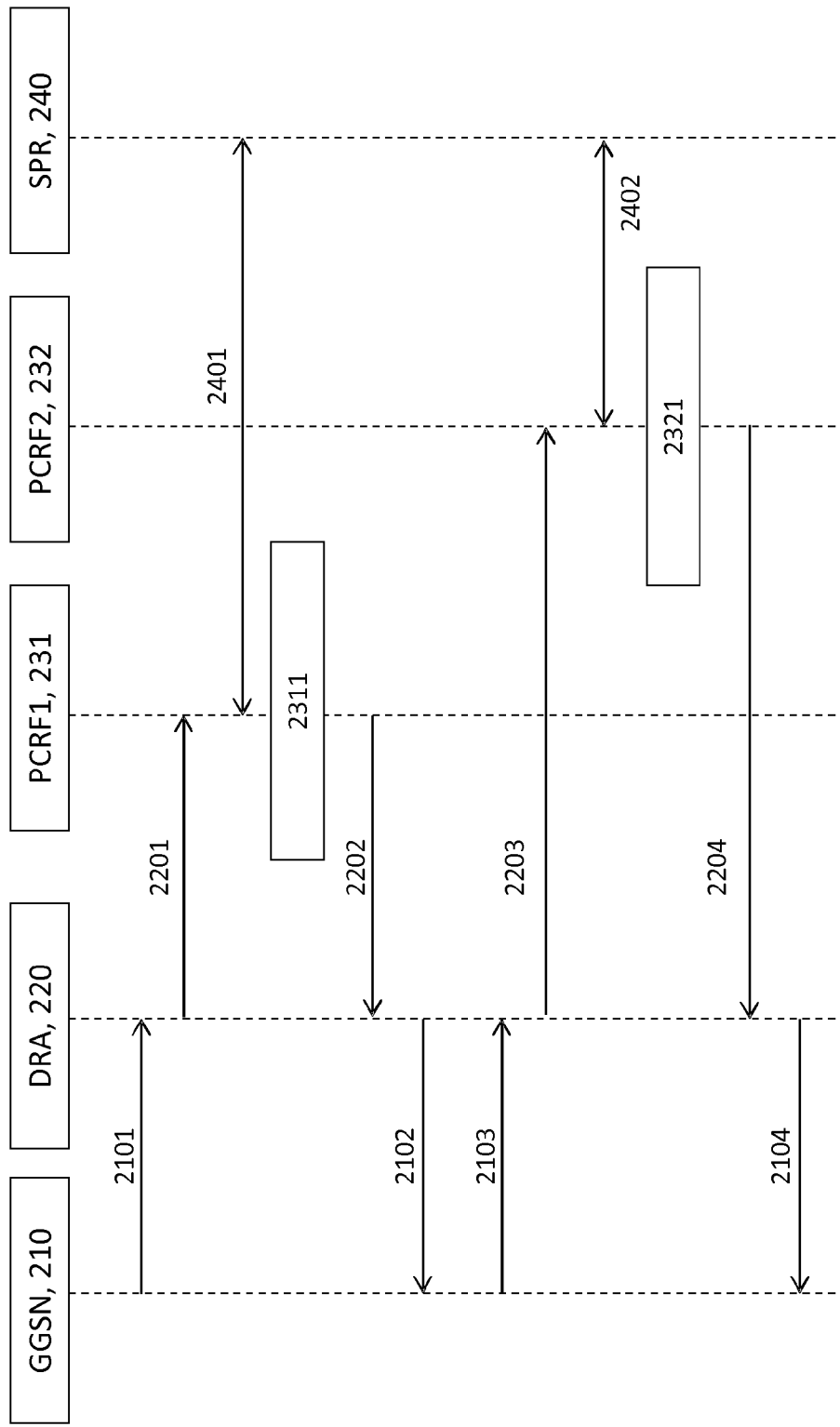
FIGS. 2a-c show procedures according to prior art wherein processing policy requests belonging to group subscription leads to data inconsistencies.
Figure 2B:
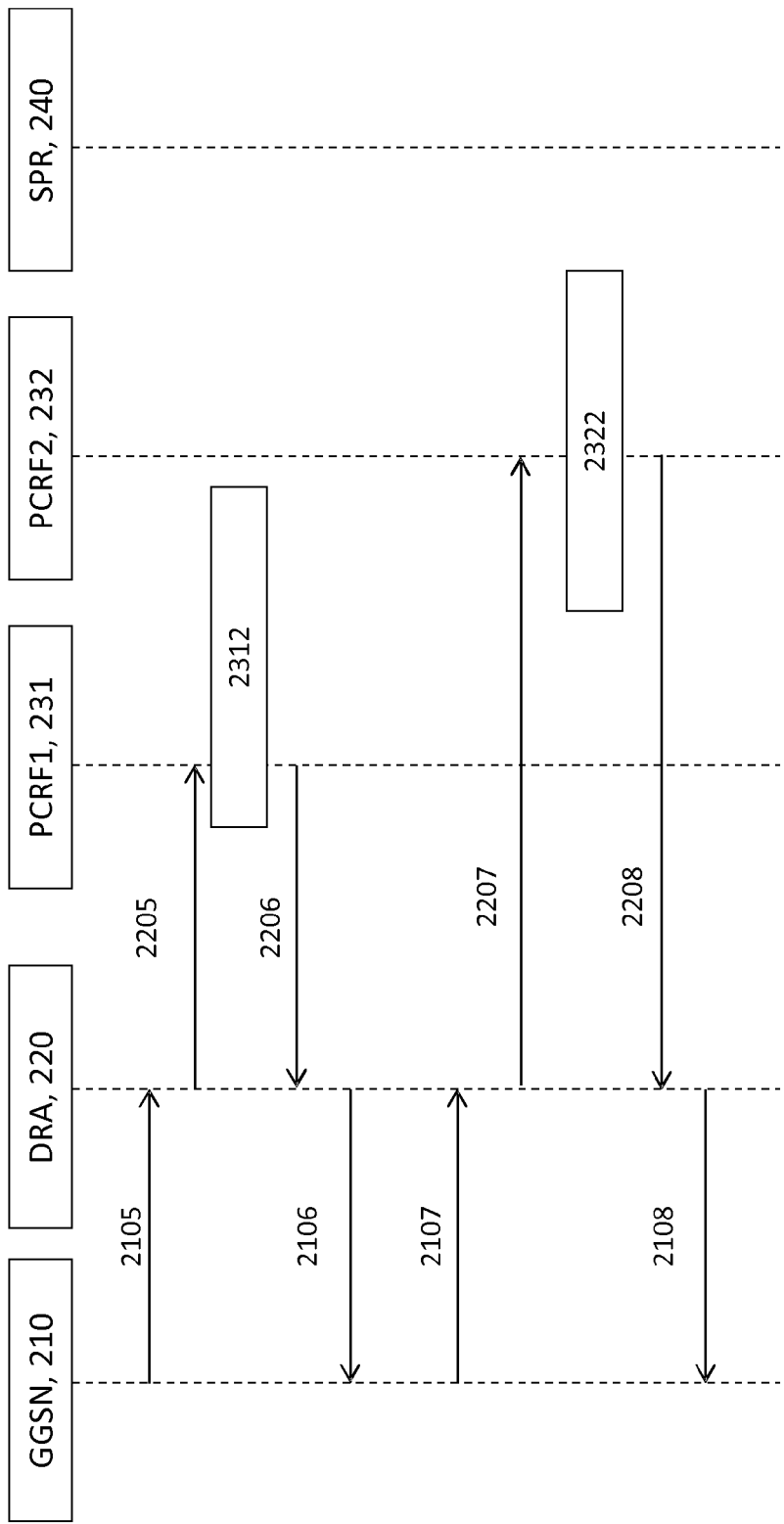
Figure 2C:
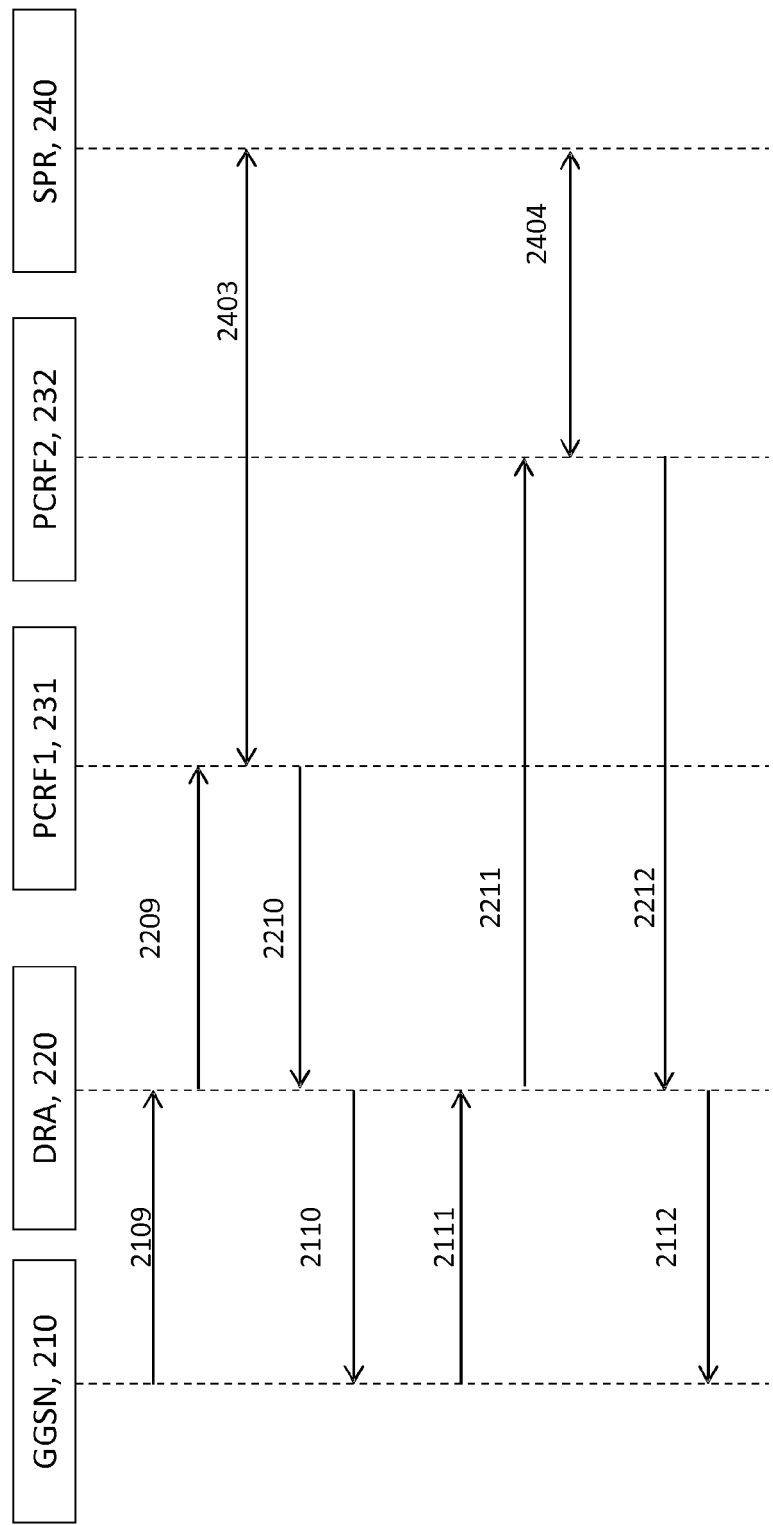

FIG. 2 illustrates examples of prior art procedures for routing and processing policy requests and highlights the deficiencies of such procedures in case of policies related to group subscription. FIG. 2a illustrates procedures during the initiation of a session, FIG. 2b illustrates procedures during the delivery of a session (ongoing session) and FIG. 2c illustrates procedures at the termination of a session.

Referring to FIG. 2a, a policy enforcement function (PCEF) such as a GGSN 210 may send 2101 a Diameter CCR-I message to a policy request router such as a Diameter routing agent (DRA) 220, during initiation of a session for a subscriber x. It may be noted that subscriber x may belong to a group of subscribers having a group subscription. Such a group subscription may govern the quality of service (QoS), allocation of service units and other related parameters for sessions initiated by the subscribers belonging to the group subscription. The DRA 220 may forward 2201 the CCR-I message to a first policy engine such as a first policy and charging rules function (PCRF1) 231.

Upon receipt of the forwarded CCR-I message, PCRF1 231 may retrieve 2401 a profile of subscriber x from a subscriber profile repository 240. The retrieved profile for subscriber x may include a profile of the group subscription. By way of example, the group subscription profile may contain an indication of a threshold of 100 service units for the group subscription. Additionally, the profile may contain indication of maximum allowed bandwidth for the group, such as a group maximum bit rate (MBR). The PCRF1 231 may store 2311 the retrieved profile in a local cache. Subsequently, PCRF1 231 may, based on the retrieved profile, send 2202 a CCA-I message to DRA 220 indicating a grant of 10 units for subscriber x, which may further be forwarded 2102 by DRA 220 to PCEF 210.

After some time, when the session initiated by subscriber x is still ongoing, a session may be initiated by another subscriber belonging to the same group subscription, say, subscriber y. This may trigger PCEF 210 to send 2103 a CCR-I for subscriber y towards DRA 220. Since DRA 220 may not be aware of the group subscription, DRA 220 may forward 2203 the CCR-I for subscriber y to a second PCRF (PCRF2) 232.

Upon receipt of the forwarded CCR-I message for subscriber y, PCRF2 232 may retrieve 2402 a profile of subscriber y from the subscriber profile repository 240. The retrieved profile for subscriber y may include the profile of the group subscription. The PCRF2 232 may store 2321 the retrieved profile in a local cache. Subsequently, PCRF2 232 may, based on the retrieved profile, send 2204 a CCA-I message to DRA 220 indicating a grant of 10 units for subscriber y, which may further be forwarded 2104 by DRA 220 to PCEF 210.

When the sessions for subscriber x and subscriber y may be ongoing, there may be policy requests for update. Such procedures are illustrated in FIG. 2b. As shown in the figure, PCEF 210 may send 2105 a CCR-U for subscriber x towards DRA 220. The CCR-U message may contain an indication of consumption of 10 service units which was earlier granted for the session. The CCR-U message may or may not contain an explicit request for grant of additional quantity of service units. DRA 220 may forward 2205 the CCR-U for subscriber x to the first PCRF (PCRF1) 231. This is by virtue of a binding DRA 220 creates so that all the policy requests for a subscriber during a session is always routed to the same policy engine.

When PCRF1 231 receives the CCR-U message, it may update 2312 the profile stored in the local cache to indicate a balance of 100−10=90 service units for the group subscription. Subsequently, PCRF1 231 may send 2206 a CCA-U message to DRA 220 indicating a grant of 10 units for subscriber x, which may further be forwarded 2106 by DRA 220 to PCEF 210.

In the course of time, PCEF 210 may send 2107 a CCR-U for subscriber y towards DRA 220. The CCR-U message may contain an indication of consumption of 10 service units which was earlier granted for the session. The CCR-U message may or may not contain an explicit request for grant of additional quantity of service units. DRA 220 may forward 2207 the CCR-U for subscriber y to the second PCRF (PCRF2) 232. This is by virtue of a binding DRA 220 creates so that all the policy requests for a subscriber during a session is always routed to the same policy engine.

When PCRF2 232 receives the CCR-U message, it may update 2322 the group subscription profile stored in the local cache to indicate a balance of 100−10=90 service units for the group subscription. It may be noted, although 10 service units for the group subscription have already been consumed during the session of subscriber x, PCRF2 is not aware of that and hence assumes a initial balance of 100 service units and updates the balance as 90 service units. Subsequently, PCRF2 232 may send 2207 a CCA-U message to DRA 220 indicating a grant of 10 units for subscriber y, which may further be forwarded 2108 by DRA 220 to PCEF 210.

Referring to FIG. 2c, when the session of subscriber x is terminated, PCEF 210 may send 2109 a CCR-T message for subscriber x towards DRA 220. The CCR-T message may contain an indication of consumption of 10 service units during a terminating segment of the session. DRA 220 may forward 2209 the CCR-T for subscriber x to the first PCRF (PCRF1) 231.

When PCRF1 231 receives the CCR-T message, it may update 2403 the profile for the group subscription in subscriber profile repository 240 to indicate a balance of 90−10=80 service units. It may be noted PCRF1 being unaware of the consumption of service units for the session of subscriber y updates the subscriber profile repository based on the consumption of service units for the session of subscriber x alone.

Subsequently, PCRF1 231 may send 2210 a CCA-T message to DRA 220 indicating a termination of the session of subscriber x. The CCA-T message may further be forwarded 2110 by DRA 220 to PCEF 210.

Similarly, when the session of subscriber y is terminated, PCEF 210 may send 2111 a CCR-T message for subscriber y towards DRA 220. The CCR-T message may contain an indication of consumption of 10 service units during a terminating segment of the session. DRA 220 may forward 2211 the CCR-T for subscriber y to the second PCRF (PCRF2) 232.

When PCRF2 232 receives the CCR-T message, it may update 2404 the profile for the group subscription in subscriber profile repository 240 to indicate a balance of 90−10=80 service units. It may be noted PCRF2 being unaware of the consumption of service units for the session of subscriber x updates the subscriber profile repository based on the consumption of service units for the session of subscriber y alone.

Subsequently, PCRF2 232 may send 2212 a CCA-T message to DRA 220 indicating a termination of the session of subscriber y. The CCA-T message may further be forwarded 2112 by DRA 220 to PCEF 210.

In the illustrative example described above, though there was a consumption of 20 service units for the session of subscriber x and 20 service units for the session of subscriber y and hence a total consumption of 40 service units and the group balance should be 60 service units, the subscriber profile repository is updated with a balance of 80 service units by PCRF1 231 and PCRF2 232. Thus, it is clear that when different PCRFs process policy requests for subscribers belonging to a group subscription, data inconsistencies can occur.

In order to overcome problems due to data inconsistencies, an alternative procedure may be followed wherein the policy engines may not store the profile in the local cache but interact with the SPR for every transaction. The alternative procedure is described below with reference to FIGS. 3a-c.

Figure 3A:
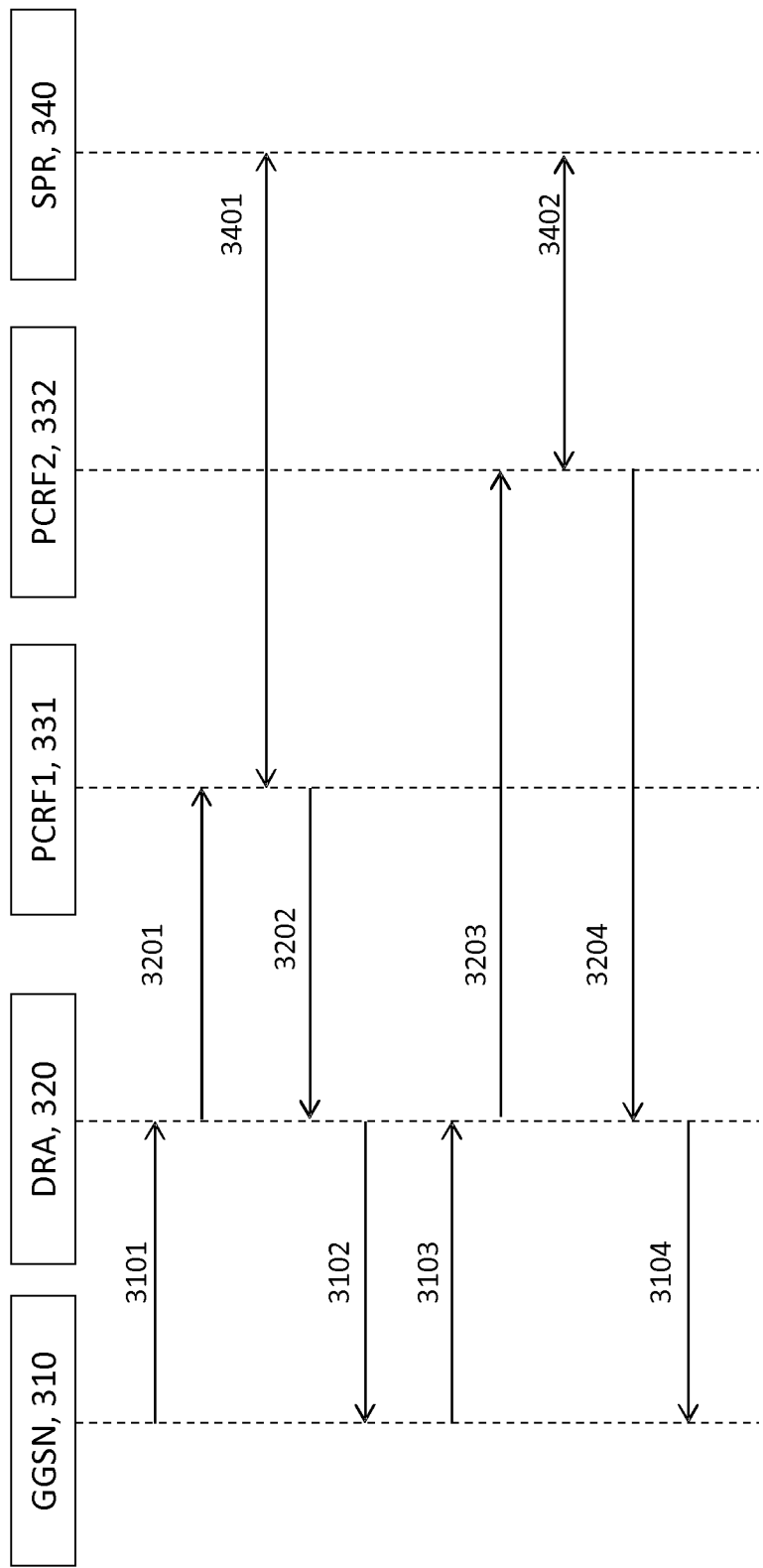
FIGS. 3a-c show procedures according to prior art wherein processing policy requests belonging to group subscription leads to increased signaling traffic.
Figure 3B:
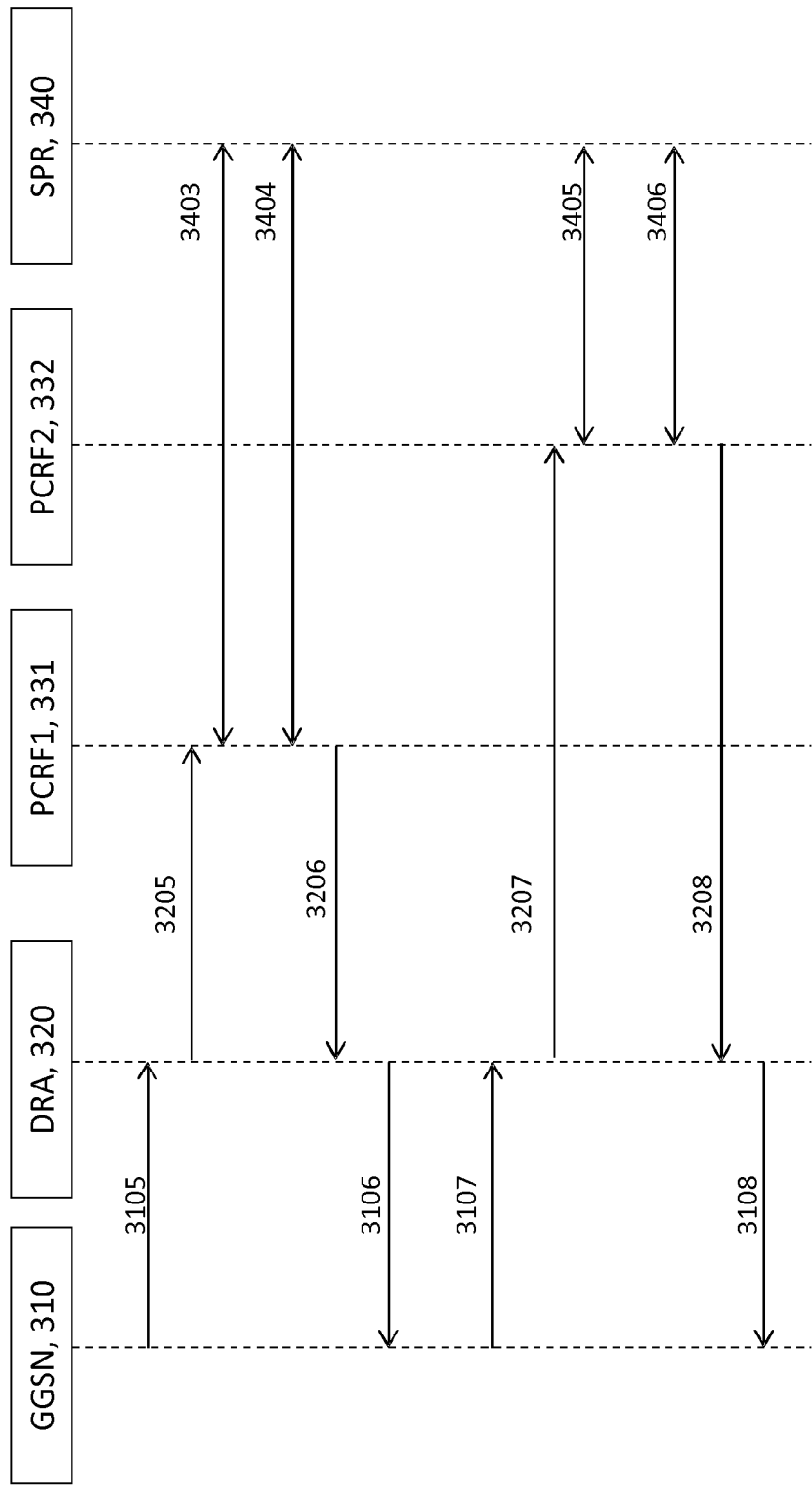
Figure 3C:
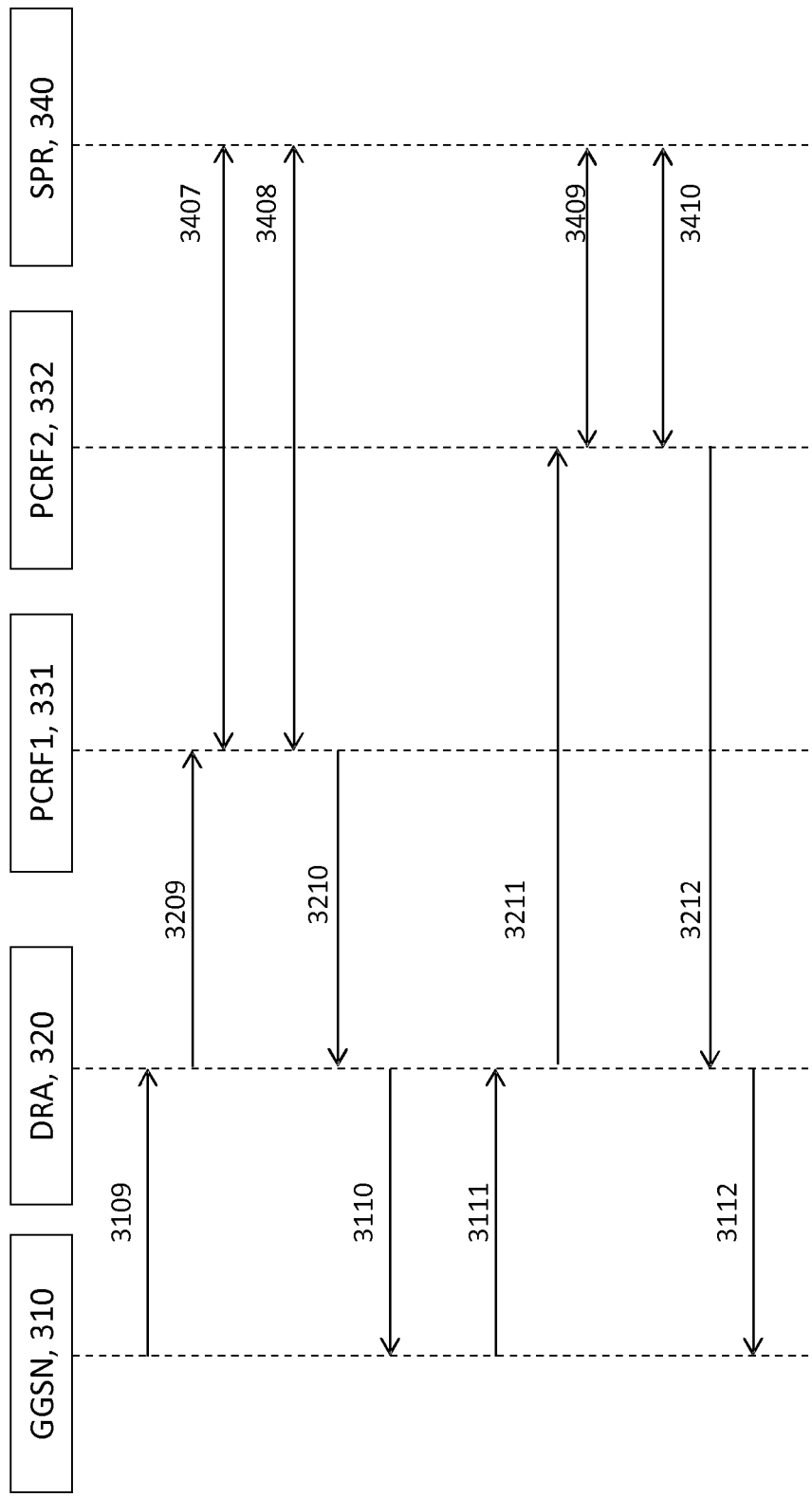

As before, FIG. 3a illustrates procedures during the initiation of a session, FIG. 3b illustrates procedures during the delivery of a session (ongoing session) and FIG. 3c illustrates procedures at the termination of a session.

Referring to FIG. 3a, a policy enforcement function (PCEF) 310 may send 3101 a Diameter CCR-I message to a Diameter routing agent (DRA) 320, during initiation of a session for subscriber x. The DRA 320 may forward 3201 the CCR-I message to a first PCRF1 331.

Upon receipt of the forwarded CCR-I message, PCRF1 331 may retrieve 3401 a profile of subscriber x from a subscriber profile repository 340. The retrieved profile for subscriber x may include a profile of the group subscription. By way of example, the group subscription profile may contain an indication of a threshold of 100 service units for the group subscription. It may be noted that in this alternative procedure, the PCRF1 331 may not store the retrieved profile in a local cache. Subsequently, PCRF1 331 may, based on the retrieved profile, send 3202 a CCA-I message to DRA 320 indicating a grant of 10 units for subscriber x, which may further be forwarded 3102 by DRA 320 to PCEF 310.

After some time, when the session initiated by subscriber x is still ongoing, a session may be initiated by subscriber y. This may trigger PCEF 310 to send 3103 a CCR-I for subscriber y towards DRA 320. Since DRA 320 may not be aware of the group subscription, DRA 320 may forward 3203 the CCR-I for subscriber y to a second PCRF (PCRF2) 332.

Upon receipt of the forwarded CCR-I message for subscriber y, PCRF2 332 may retrieve 3402 a profile of subscriber y from the subscriber profile repository 340.

The retrieved profile for subscriber y may include the profile of the group subscription. The PCRF2 332 may not store the retrieved profile in a local cache. Subsequently, PCRF2 332 may, based on the retrieved profile, send 3204 a CCA-I message to DRA 320 indicating a grant of 10 units for subscriber y, which may further be forwarded 3104 by DRA 320 to PCEF 310.

When the sessions for subscriber x and subscriber y may be ongoing, there may be policy requests for update. Such procedures are illustrated in FIG. 3b. As shown in the figure, PCEF 310 may send 3105 a CCR-U for subscriber x towards DRA 320. The CCR-U message may contain an indication of consumption of 10 service units which was earlier granted for the session. The CCR-U message may or may not contain an explicit request for grant of additional quantity of service units. DRA 320 may forward 3205 the CCR-U for subscriber x to the first PCRF (PCRF1) 331. This is by virtue of a binding DRA 320 creates so that all the policy requests for a subscriber during a session is always routed to the same policy engine.

When PCRF1 331 receives the CCR-U message, it may retrieve 3403 the profile for subscriber x from the subscriber profile repository 340. The retrieved profile may indicate a balance of 100 service units for the group subscription to which subscriber x belongs. Subsequently, PCRF1 331 may update 3404 the profile for the group subscription in subscriber profile repository 340 to indicate a balance of 100−10=90 service units. Subsequently, PCRF1 331 may send 3206 a CCA-U message to DRA 320 indicating a grant of 10 units for subscriber x, which may further be forwarded 3106 by DRA 320 to PCEF 310.

In the course of time, PCEF 310 may send 3107 a CCR-U for subscriber y towards DRA 320. The CCR-U message may contain an indication of consumption of 10 service units which was earlier granted for the session. The CCR-U message may or may not contain an explicit request for grant of additional quantity of service units. DRA 320 may forward 3207 the CCR-U for subscriber y to the second PCRF (PCRF2) 332. This is by virtue of a binding DRA 320 creates so that all the policy requests for a subscriber during a session is always routed to the same policy engine.

When PCRF2 332 receives the CCR-U message, it may retrieve 3405 the profile for subscriber y from the subscriber profile repository 340. The retrieved profile may indicate a balance of 90 service units for the group subscription to which subscriber y belongs. Subsequently, PCRF2 332 may update 3406 the profile for the group subscription in subscriber profile repository 340 to indicate a balance of 90−10=80 service units. Subsequently, PCRF2 332 may send 3208 a CCA-U message to DRA 320 indicating a grant of 10 units for subscriber y, which may further be forwarded 3108 by DRA 320 to PCEF 310.

Referring to FIG. 3c, when the session of subscriber x is terminated, PCEF 310 may send 3109 a CCR-T message for subscriber x towards DRA 320. The CCR-T message may contain an indication of consumption of 10 service units during a terminating segment of the session. DRA 320 may forward 3209 the CCR-T for subscriber x to the first PCRF (PCRF1) 331.

When PCRF1 331 receives the CCR-T message, it may retrieve 3407 the profile for subscriber x from the subscriber profile repository 340. The retrieved profile may indicate a balance of 80 service units for the group subscription to which subscriber x belongs. Subsequently, PCRF1 331 may update 3408 the profile for the group subscription in subscriber profile repository 340 to indicate a balance of 80−10=70 service units.

Subsequently, PCRF1 331 may send 3210 a CCA-T message to DRA 320 indicating a termination of the session of subscriber x. The CCA-T message may further be forwarded 3110 by DRA 320 to PCEF 310.

Similarly, when the session of subscriber y is terminated, PCEF 310 may send 3111 a CCR-T message for subscriber y towards DRA 320. The CCR-T message may contain an indication of consumption of 10 service units during a terminating segment of the session. DRA 320 may forward 3211 the CCR-T for subscriber x to the second PCRF (PCRF2) 332.

When PCRF2 332 receives the CCR-T message, it may retrieve 3409 the profile for subscriber y from the subscriber profile repository 340. The retrieved profile may indicate a balance of 70 service units for the group subscription to which subscriber y belongs. Subsequently, PCRF2 332 may update 3410 the profile for the group subscription in subscriber profile repository 340 to indicate a balance of 70−10=60 service units.

Subsequently, PCRF2 332 may send 3212 a CCA-T message to DRA 320 indicating a termination of the session of subscriber y. The CCA-T message may further be forwarded 3112 by DRA 320 to PCEF 310.

The above procedure of processing policy requests overcomes the problem of data inconsistencies by repeated interaction with the subscriber profile repository 340 for every transaction. However, this necessitates several signaling messages between the policy engines and the subscriber profile repository. In case of a typical group subscription, there can be many subscribers having simultaneous sessions which may lead to several transactions. Thus, there may be a significant increase in the signaling.

Embodiments of the present invention overcome the above said problems as described below with reference to the figures.

Figure 4:
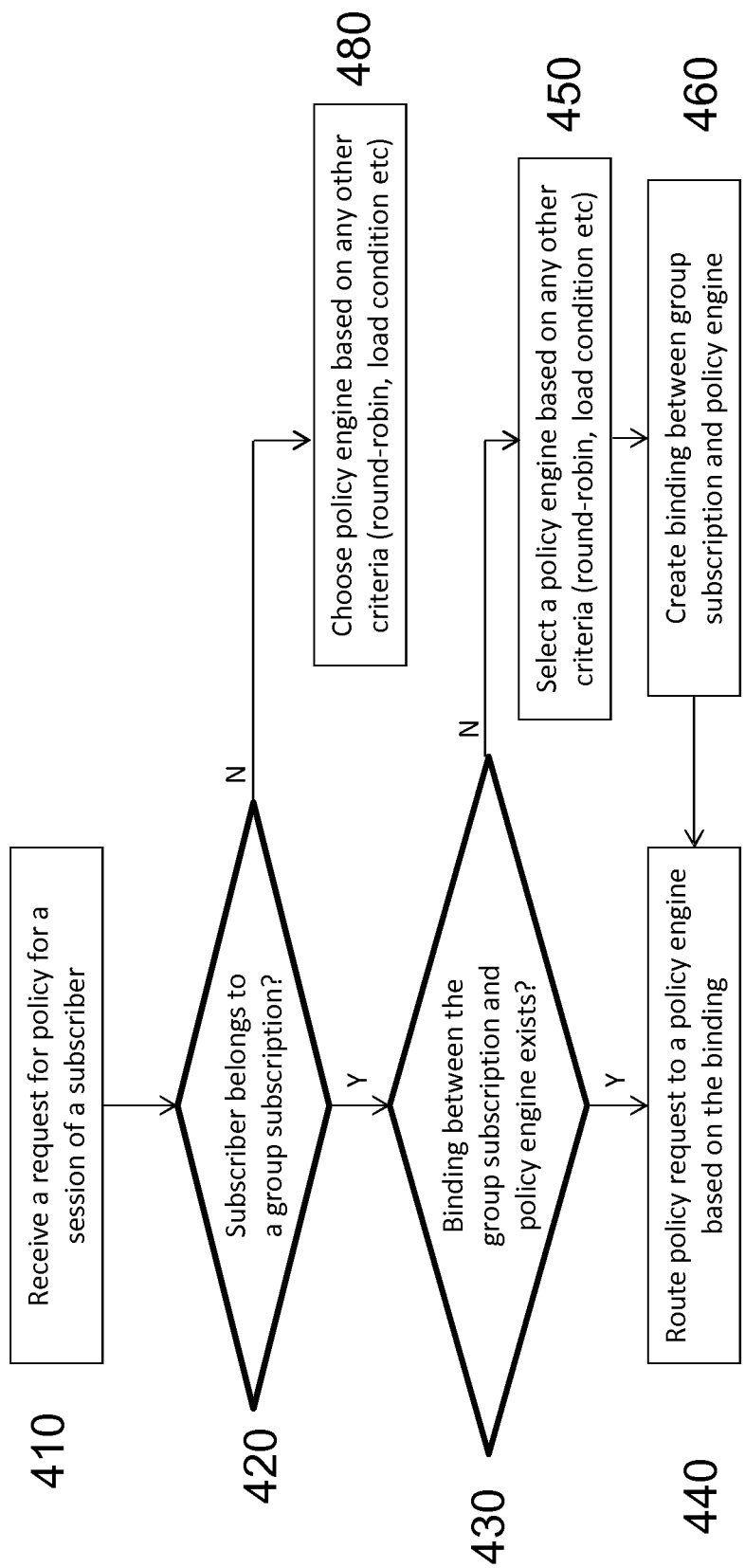
FIG. 4 shows a scheme of routing policy requests to policy engines according to embodiments of the invention.

FIG. 4 illustrates an example procedure for routing policy requests according to some embodiments of the invention. According to the procedure, when a policy request router such as a Diameter routing agent (DRA) receives 410 a policy request for a session of a subscriber, it may first determine 420 if the subscriber belongs to a group of subscribers having a group subscription. Such a determination 420 may be based on a previously provisioned information about the group subscription. The provisioning may be through a broadcast of the information by a subscriber profile repository (SPR). The broadcast may be directly delivered to the DRA, if an interface exists between the DRA and SPR, or through a provisioning server. Alternatively, the determination 420 may be based on a retrieval of information about the group subscription by the DRA, after the receipt of the policy request. Such a retrieval of information may be directly from the SPR or indirectly through a provisioning server.

If it is determined that the subscriber belongs to a group subscription, the DRA may verify 430 if a binding exists between the group subscription and at least one policy engine. It may be noted that typically a plurality of policy engines may exist in the network which can process policy requests. When the information about a group subscription is available with DRA, it may create a binding between the group subscription and a chosen policy engine. The binding may be static, i.e., the binding is created as soon as an information about the group subscription is known to DRA and is unchanged irrespective of the load conditions etc.

Alternatively, the binding may be dynamic, i.e., the binding is created only when a first session initiation request for the group subscription occurs and may be removed when all sessions belonging to the group subscription are terminated.

If a binding between the group subscription and at least one policy engine exists, the policy request is routed 440 to the at least one policy engine. If such binding does not exist, DRA may select 450 any one policy engine. The selection 450 may be based on the load conditions of the policy engines, a round-robin selection method or a random selection. Once the policy engine is selected, DRA may create 460 a binding between the selected policy engine and the group subscription and use such a binding to route 440 all policy requests for the group subscription to the selected policy engine.

It may be noted that if the subscriber does not belong to a group of subscribers having a group subscription, DRA may choose 480 a policy engine based on any criteria such as load conditions, round-robin selection method etc. In such a case, DRA may only create a binding between the subscriber and the chosen policy engine so that all policy requests for a session of the subscriber may be routed the chosen policy engine.

Figure 5:
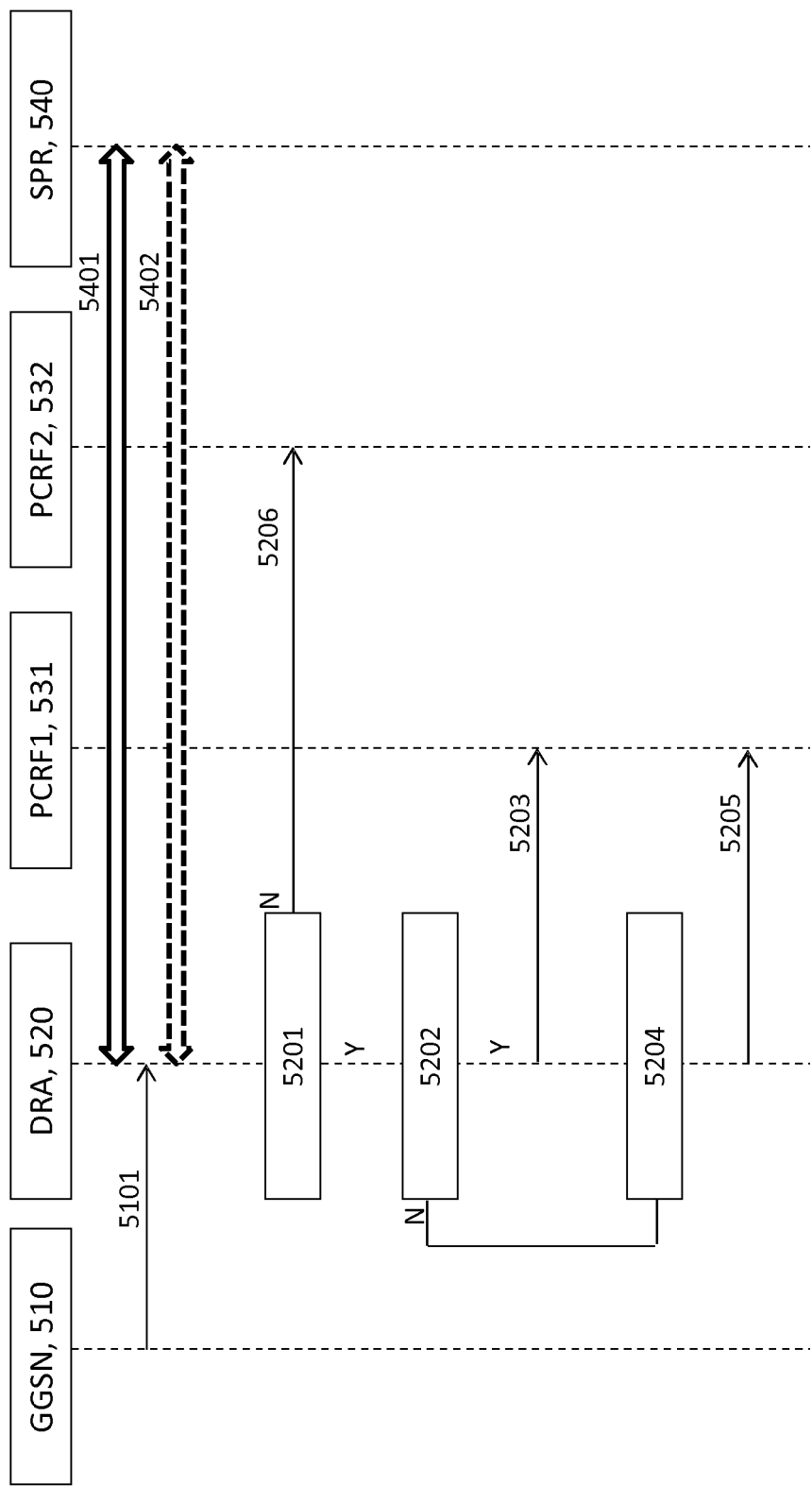
FIG. 5 shows an illustrative example message flow diagram for routing policy requests to policy engines according to embodiments of the invention.

FIG. 5 shows a message flow diagram illustrating an exemplary procedure according to some embodiments of the invention. In this example, during an initiation of a session, a policy enforcement function (PCEF) 510 may send 5101 a CCR-I for a subscriber x towards a DRA 520. As shown in figure, information relating a group subscription may have been previously provisioned 5401 to DRA 520. Alternatively, DRA 520 upon receipt of the CCR-I from PCEF 510 may retrieve 5402 such information. Such provisioning or retrieval can be directly over an interface between an SPR 540 and DRA 520 or over a provisioning server (not shown in figure). The information may contain the group of subscribers belonging to the group subscription, which allows the determination 5201 as to if subscriber x belongs to the group subscription. If it is determined that subscriber x belongs to a group subscription, it may be verified 5202 if a binding between the group subscription and a policy engine exists. If it is found, for example, that there is a binding between the group subscription and a first policy engine (PCRF1) 531, the CCR-I message may be forwarded 5203 to PCRF1 531. On the other hand, if it is determined 5201 that subscriber x belongs to a group subscription, but upon verification 5202, it is found that no binding exists between the group subscription and any one policy engine, DRA 420 may select PCRF1 531 for processing the policy requests of the group subscription and create 5204 a binding between the group subscription and PCRF1 531. The selection of PCRF1 531 for processing the policy requests of the group subscription may be based on the load conditions of the policy engines (PCRF1 531 and PCRF2 532 in the example shown in FIG. 5), a round-robin selection method or a random selection.

It may be noted that if it is determined 5201 that subscriber x does not belong to a group of subscribers having a group subscription, DRA 520 may forward 5206 the CCR-I message to any one a first and second policy engines. In the example shown in FIG. 5, the CCR-I message is forwarded 5206 to PCRF2 532. Such forwarding may be based on any criteria such as load conditions, round-robin selection method etc.

The above described procedure with reference to FIGS. 4 and 5 ensures that policy requests of subscribers belonging to a group of subscribers having a group subscription are routed to the same policy engine, PCRF1 531 in the example. When a policy request for another subscriber, subscriber y belonging to the same group subscription as subscriber x is received by the DRA 520, the procedure ensures that the policy request is routed to PCRF1 531 by virtue of the determination 5201 and verification 5202 processes. When all sessions belonging to the group subscription are terminated, DRA 520 may choose to remove any binding between the group subscription and the policy engine.

It may further be noted that the procedures are applicable even when the policy requests originate from a plurality of network entities, e.g., multiple PCEFs 510. Since all these requests are routed by DRA by virtue of the binding between group subscription and policy engine, the originating PCEF 510 does not affect the procedures. Further, if a plurality of DRAs 520 exists in the network, the procedures can be extended, since a binding created between a group subscription and a policy engine may be communicated across such plurality of DRAs 520.

Figure 6A:
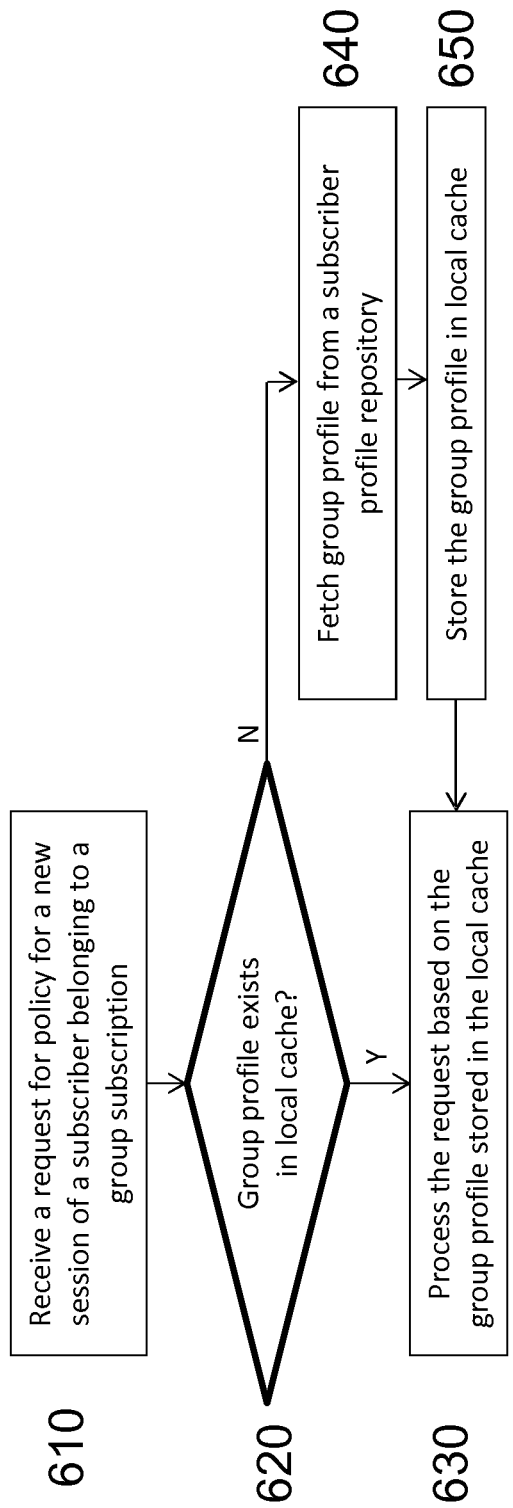
FIGS. 6a-c show a scheme of processing policy requests according to embodiments of the invention.
Figure 6B:
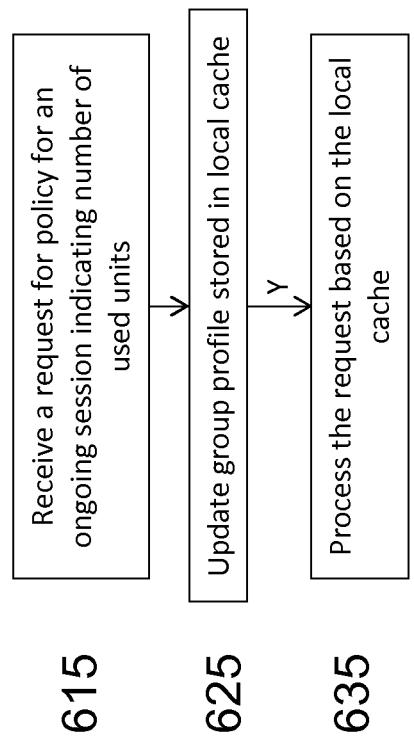
Figure 6C:
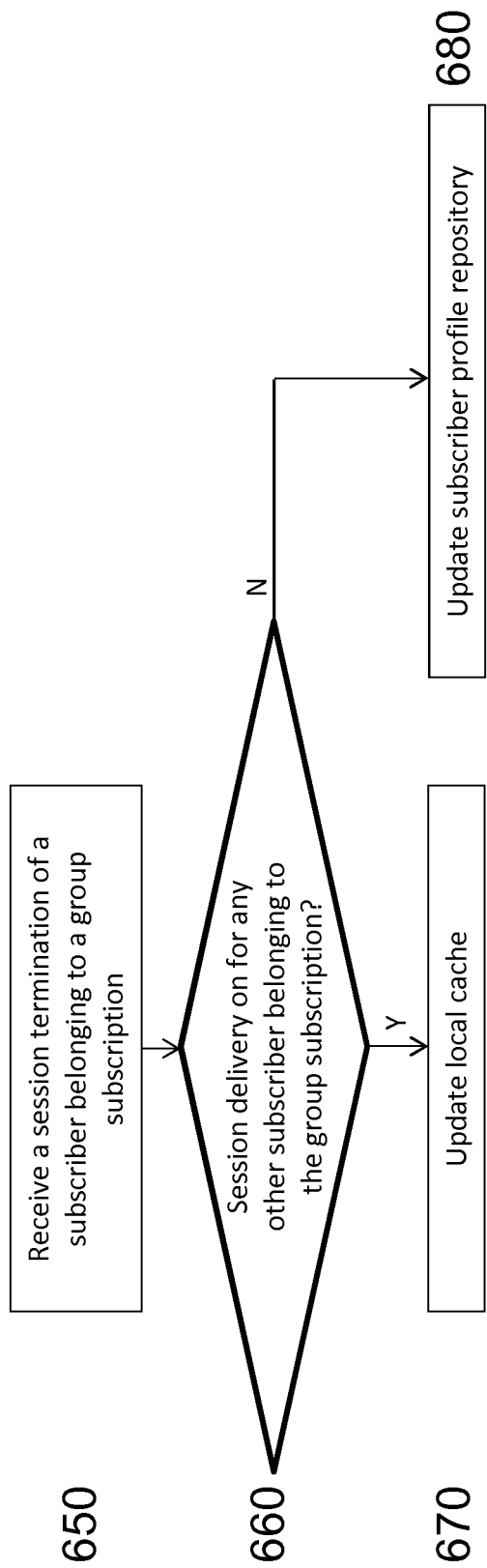

FIGS. 6a-c illustrate procedures according to some embodiments of the invention for processing policy requests for a subscriber belonging to a group subscription. Referring to FIG. 6a, when a policy engine receives 610 a policy request for a new session of a subscriber belonging to a group subscription, it may verify 620 if a profile associated with the group subscription exits in a local cache of the policy engine. If a profile exists, the policy engine may process 630 the policy request based on the existing profile in local cache. If a profile does not exist in the local cache, the policy engine may retrieve 640 the profile from a subscriber profile repository and store in the local cache.

It may be noted that the policy request received 610 from a DRA may contain an indication that the subscriber belongs to a group subscription. In such a case, the policy engine may verify if a profile for the group subscription already exists in the local cache. In another possibility, the policy engine may verify if the subscriber is part of a group subscription for which a profile exists in the local cache. In yet another possibility, the policy engine may retrieve a profile for the subscriber which may contain a profile of a group subscription to which the subscriber may belong.

Referring to FIG. 6b, when a policy request is received 615 during an ongoing session indicating a quantity of service units used during a segment of the session, the policy engine may update 625 the profile for the group subscription stored in the local cache, instead of fetching the group profile from SPR and updating the profile in SPR (e.g., steps 3405, 3406 or 3407, 3408 in FIG. 3). Subsequently, the policy request may be processed 535 based on the profile stored in the local cache.

Referring to FIG. 6c, when a policy request is received 650 when the session for a subscriber is terminated, the policy engine will verify 660 if any other session is ongoing for any other subscriber belonging to the group subscription. If at least one session is ongoing for any other subscriber, the policy engine will only update 670 the profile stored in the local cache. If all sessions related to the group subscription are terminated, the policy engine may update 680 the profile in subscriber profile repository.

The above described procedures overcome the problem of data inconsistencies as well as avoid the need for signaling, as further illustrated below by way of examples with reference to FIGS. 7a-c.

Figure 7A:
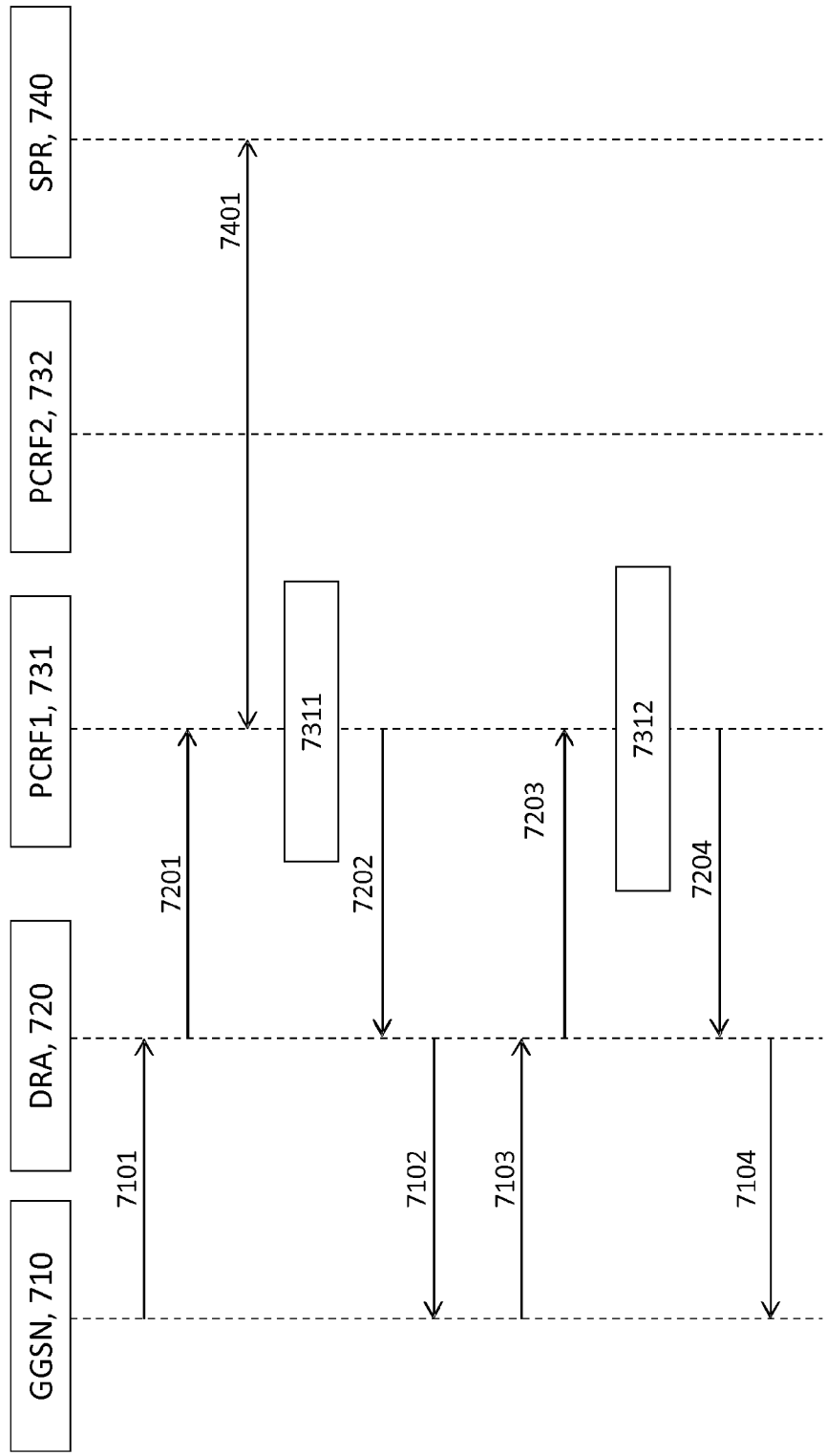
FIGS. 7a-c show illustrative example message flow diagrams for processing policy requests according to embodiments of the invention.
Figure 7B:
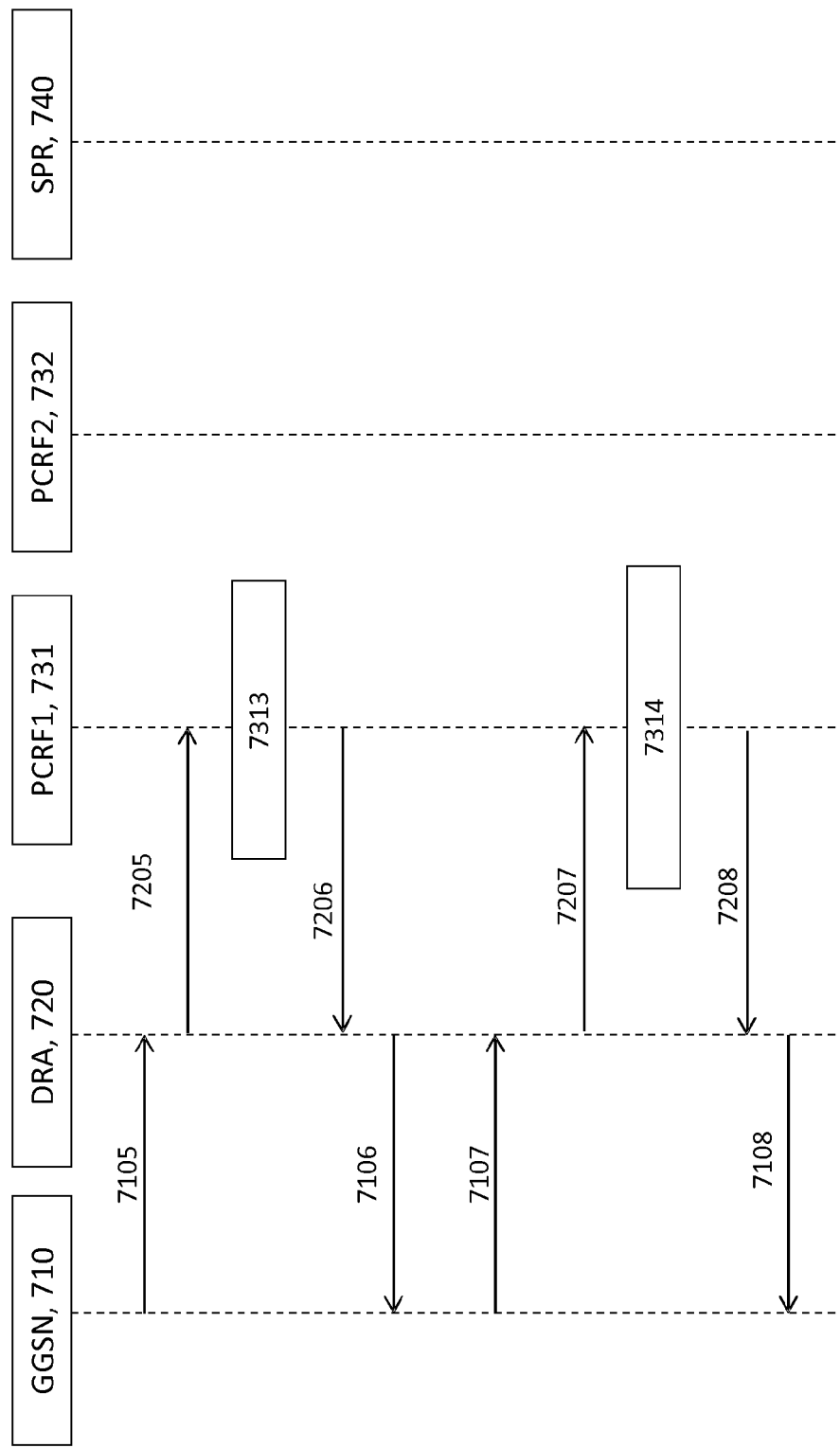
Figure 7C:
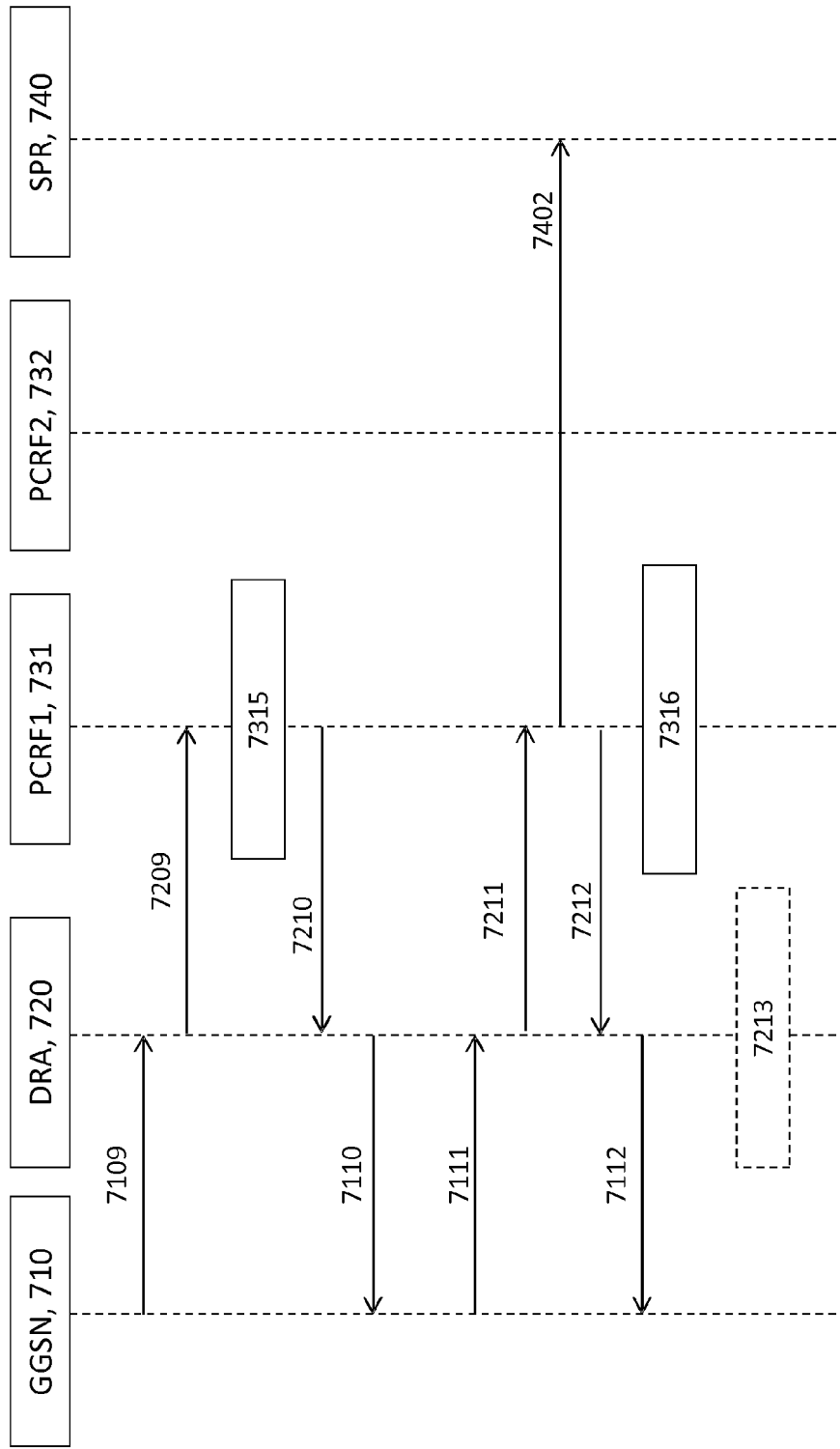

FIG. 7a illustrates procedures according to some embodiments of the invention during the initiation of a session, FIG. 7b illustrates procedures during the delivery of a session (ongoing session) and FIG. 7c illustrates procedures at the termination of a session.

Referring to FIG. 7a, a policy enforcement function (PCEF) 710 may send 7101 a Diameter CCR-I message to a policy request router such as a Diameter routing agent (DRA) 720, during initiation of a session for a subscriber x. It may be noted that subscriber x may belong to a group of subscribers having a group subscription. Such a group subscription may govern the quality of service (QoS), allocation of service units and other related parameters for sessions initiated by the subscribers belonging to the group subscription. The DRA 720 may forward 7201 the CCR-I message to a first policy engine such as a first policy and charging rules function (PCRF1) 731. The forwarding 7201 of the CCR-I message to PCRF1 731 may be based on a determining that subscriber x belongs to a group subscription and verifying that a binding exists between the group subscription and PCRF1 731. The determination that subscriber x belongs to a group subscription may be possible since information about the group subscription may be pre-provisioned or may have been retrieved by the DRA 720.

Upon receipt of the forwarded CCR-I message, PCRF1 731 may retrieve 7401 a profile of subscriber x from a subscriber profile repository 740. The retrieved profile for subscriber x may include a profile of the group subscription. By way of example, the group subscription profile may contain an indication of a threshold of 100 service units for the group subscription. The PCRF1 731 may store 7311 the retrieved profile in a local cache. Subsequently, PCRF1 731 may, based on the retrieved profile, send 7202 a CCA-I message to DRA 720 indicating a grant of 10 units for subscriber x, which may further be forwarded 7102 by DRA 720 to PCEF 710.

After some time, when the session initiated by subscriber x is still ongoing, a session may be initiated by another subscriber belonging to the same group subscription, say, subscriber y. This may trigger PCEF 710 to send 7103 a CCR-I for subscriber y towards DRA 720. Since DRA 720 is aware of the group subscription as described earlier, DRA 720 may forward 7203 the CCR-I for subscriber y to the same PCRF, i.e., PCRF1 731.

Upon receipt of the forwarded CCR-I message for subscriber y, PCRF1 732 may not need to retrieve a profile of subscriber y from the subscriber profile repository 740, since subscriber y belongs to a group subscription, the profile of which is available in the local cache. Thus, PCRF1 731 may look up 7312 the group subscription profile stored in the local cache and may send 7204 a CCA-I message to DRA 720 indicating a grant of 10 units for subscriber y, which may further be forwarded 7104 by DRA 720 to PCEF 710.

When the sessions for subscriber x and subscriber y may be ongoing, there may be policy requests for update. Such procedures are illustrated in FIG. 7b. As shown in the figure, PCEF 710 may send 7105 a CCR-U for subscriber x towards DRA 720. The CCR-U message may contain an indication of consumption of 10 service units which was earlier granted for the session. The CCR-U message may or may not contain an explicit request for grant of additional quantity of service units. DRA 720 may forward 7205 the CCR-U for subscriber x to PCRF1 731.

When PCRF1 731 receives the CCR-U message, it may update 7313 the group subscription profile stored in the local cache to indicate a balance of 100−10=90 service units for the group subscription. Subsequently, PCRF1 731 may send 7206 a CCA-U message to DRA 720 indicating a grant of 10 units for subscriber x, which may further be forwarded 7106 by DRA 720 to PCEF 710.

In the course of time, PCEF 710 may send 7107 a CCR-U for subscriber y towards DRA 720. The CCR-U message may contain an indication of consumption of 10 service units which was earlier granted for the session. The CCR-U message may or may not contain an explicit request for grant of additional quantity of service units. DRA 720 may forward 7207 the CCR-U for subscriber y to PCRF1 731.

When PCRF1 731 receives the CCR-U message, it may update 7314 the group subscription profile stored in the local cache to indicate a balance of 90−10=80 service units for the group subscription. It may be noted the data inconsistencies (as noted in the description for FIG. 2b) are avoided since the same PCRF (PCRF1) 731 processes policy requests for both subscriber x and subscriber y by virtue of the group subscription to which the subscribers belong. Subsequently, PCRF1 731 may send 7208 a CCA-U message to DRA 720 indicating a grant of 10 units for subscriber y, which may further be forwarded 7108 by DRA 720 to PCEF 710.

Referring to FIG. 7c, when the session of subscriber x is terminated, PCEF 710 may send 7109 a CCR-T message for subscriber x towards DRA 720. The CCR-T message may contain an indication of consumption of 10 service units during a terminating segment of the session. DRA 720 may forward 7209 the CCR-T for subscriber x to the first PCRF (PCRF1) 731.

When PCRF1 731 receives the CCR-T message, it may update 7315 the profile for the group subscription to indicate a balance of 80−10=70 service units. It may be noted that PCRF1 may not update the subscriber profile repository since the session of subscriber y is still ongoing.

Subsequently, PCRF1 731 may send 7210 a CCA-T message to DRA 720 indicating a termination of the session of subscriber x. The CCA-T message may further be forwarded 7110 by DRA 720 to PCEF 710.

Similarly, when the session of subscriber y is terminated, PCEF 710 may send 7111 a CCR-T message for subscriber y towards DRA 720. The CCR-T message may contain an indication of consumption of 10 service units during a terminating segment of the session. DRA 720 may forward 7211 the CCR-T for subscriber y to PCRF1 231.

When PCRF1 731 receives the CCR-T message, it may update 7402 the profile for the group subscription in subscriber profile repository 740 to indicate a balance of 70−10=60 service units. It may be noted PCRF1 updates the subscriber profile repository 740 in this case since no other session belonging to the group subscription is ongoing.

Subsequently, PCRF1 731 may send 7212 a CCA-T message to DRA 720 indicating a termination of the session of subscriber y. The CCA-T message may further be forwarded 7112 by DRA 720 to PCEF 710.

Since all the sessions belonging to the group subscription are terminated, PCRF1 731 may decide to remove 7316 the group subscription profile from the local cache. Similarly, DRA 720 may also optionally remove the binding between the group subscription and PCRF1 731. However, DRA 720 may retain the information related to group subscription for use with any future sessions of the group.

The above example illustrates how data inconsistencies encountered with the procedure described with reference to FIG. 2a-c are overcome. In addition, in comparison with the procedure described with reference to FIG. 3a-c, wherein ten signaling messages are exchanged between the policy engines and SPR for two subscribers belonging to a group subscription and having three transactions each, the exemplary procedure of the invention always involves only two signaling messages irrespective of number of subscribers in the group and number of transactions during the sessions.

Figure 8:
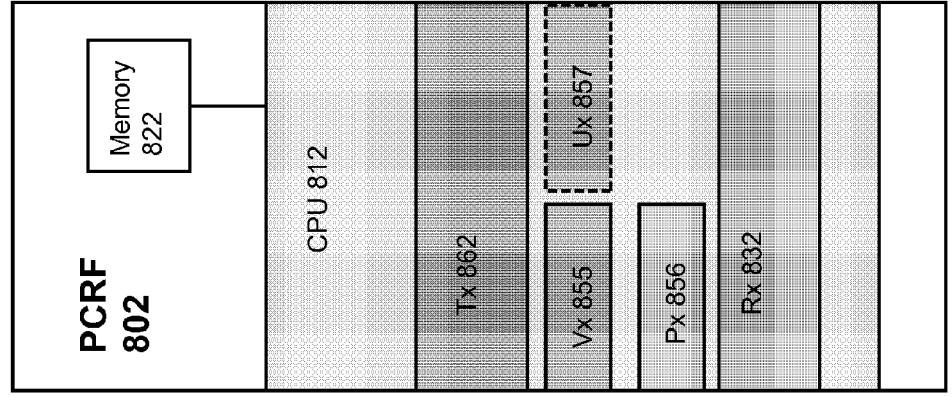
FIG. 8 shows a system and apparatuses for routing and processing policy requests according to embodiments of the invention.
Figure 8:
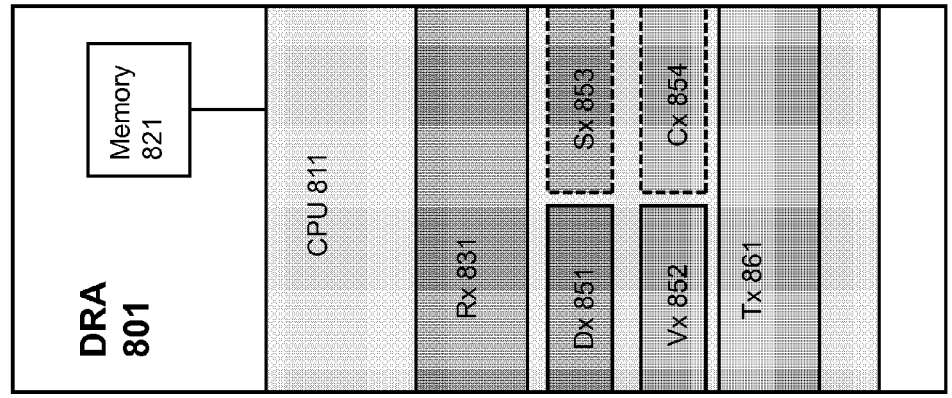

The present invention also provides a first and second apparatuses as shown in FIG. 8, wherein the procedures according to the embodiments of the invention may be performed. The first apparatus (DRA) 801 in accordance with the present invention may provide the functions of a policy request router such as a Diameter routing agent (DRA) defined by the 3GPP that may be enhanced with features of the present invention.

The first apparatus 801, according to examples of the present invention, may comprise:
- a Central Processing Unit (CPU or a core functionality) 811;
- a memory 821;
- means for receiving (Rx), or an input unit configured to receive 831, policy related requests;
- means for transmitting (Tx), or an output unit configured to transmit 861, the policy related requests as well responses for those requests;
- means for determining (Dx), or a determining unit configured to determine 851, if a subscriber belongs to a group subscription; and
- means for verifying (Vx), or a verifying unit configured to verify 852, if a binding between the group subscription and a policy engine exists.

The first apparatus 801 may further comprise:
- means for selecting (Sx), or a selecting unit configured to select 853, a policy engine among a plurality of policy engines; and
- means for creating (Cx), or a creating unit configured to create 854, a binding between a group subscription and a policy engine.

It may be noted that the various units listed above such as the means for receiving Rx 831 etc of the apparatus 801 may be functionalities running on the CPU 811 of the apparatus, or may alternatively be separate functional entities or means. Further, the various units may have interfaces between them which are not shown in FIG. 8 for sake of simplicity.

The CPU 811 may be configured to process various data inputs and to control the functions of the memory 821, the various other functional units present in the apparatus 801. The memory 821 may serve e.g. for storing code means for carrying out e.g. the methods according to the examples of the present invention, when run e.g. on the CPU 811. For example, the memory 821 may store an information about a binding between a group subscription and a policy engine. Additionally, the memory 821 may store addresses of the various policy engines that may be present in a network.

It may be noted that the means for receiving 831 and the means for transmitting 861 may alternatively be provided as integral transceivers. It may further be noted that the means for receiving 831 and the means for transmitting 861 may be implemented i) as physical transmitters/receivers for transceiving e.g. via the air interface, ii) as routing entities e.g. for sending/receiving data packets e.g. in a PS (packet switched) network, or, iii) as any suitable combination of i) and ii).

According to certain embodiments of the invention, the means for receiving 831 may receive a policy request for establishment of a session for a subscriber. Such policy request may be e.g., a Diameter Credit Control Request (CCR) message. Upon receipt of the policy request, means for determining 851 of the apparatus 801 may determine if the subscriber belongs to a group subscription. The means for determining 851 may determine so by looking up at any previously provisioned information about the group subscription that may be stored in the memory 821. Alternatively, it may determine by interaction with a subscriber profile repository.

If it is determined that the subscriber belongs to a group subscription, then the means for verifying 852 may verify if a binding exists between at least one policy engine among a plurality of policy engines and the group subscription. Such a binding may have been created previously and stored in the memory 851 of the apparatus 801. If such a binding exists, in accordance with the binding, the means for transmitting 861 may route the policy request to the policy engine.

On the other hand, if it is determined by the means for determining 851 that the subscriber belongs to a group subscription but no binding exists between the group subscription and any policy engine, the means for selecting 853 may select any one policy engine among the plurality of policy engines for processing the request and the means for creating 854 may create a binding between the selected any one policy engine and the group subscription. Such selection procedure by the means for selecting 853 may be based on the load conditions of the plurality of policy engines, a round-robin selection method or a random selection.

The second apparatus 802, according to examples of the present invention, may comprise:
- a Central Processing Unit (CPU or a core functionality) 812;
- a memory 822;
- means for receiving (Rx), or an input unit configured to receive 832, policy related requests;
- means for transmitting (Tx), or an output unit configured to transmit 862, responses for the policy requests;

means for verifying (Vx), or a verifying unit configured to verify 855, if a profile of a group subscription exists in a local cache (memory 822); and means for processing (Px), or a processing unit configured to process 856, the policy requests.

The second apparatus 802 may further comprise means for updating (Ux), or an updating unit configured to update 857, a profile of the group subscription in a local cache (memory 822). The means for transmitting 862 may serve as means for updating a profile in a subscriber profile repository. The means for transmitting 862 in combination with the means for receiving 832 may serve as means for retrieving a profile from a subscriber profile repository.

It may be noted that the various units listed above such as the means for receiving Rx 832 etc of the apparatus 802 may be functionalities running on the CPU 812 of the apparatus, or may alternatively be separate functional entities or means. Further, the various units may have interfaces between them which are not shown in FIG. 8 for sake of simplicity.

The CPU 812 may be configured to process various data inputs and to control the functions of the memory 822, the various other functional units present in the apparatus 802. The memory 822 may serve e.g. for storing code means for carrying out e.g. the methods according to the examples of the present invention, when run e.g. on the CPU 812. For example, the memory 822 may store a profile of a group subscription.

It may be noted that the means for receiving 832 and the means for transmitting 862 may alternatively be provided as integral transceivers. It may further be noted that the means for receiving 832 and the means for transmitting 862 may be implemented i) as physical transmitters/receivers for transceiving e.g. via the air interface, ii) as routing entities e.g. for sending/receiving data packets e.g. in a PS (packet switched) network, or, iii) as any suitable combination of i) and ii).

According to certain embodiments of the invention, the means for receiving 832 may receive a policy request for a subscriber belonging to a group subscription. Such a policy request can be a Diameter credit control request (CCR) message and may have been forwarded by a Diameter Routing Agent (DRA). Upon receipt of the policy request, the means for verifying 855 may verify if a profile of the group subscription is stored in a local cache. The profile of the group subscription may have been previously retrieved from a subscriber profile repository and stored in a local cache. Herein, the memory 822 of the apparatus 802 may serve as the local cache. If a profile of the group subscription exists in the local cache, then the means for processing 856 may process the policy request for the session of the subscriber based on the stored profile.

If a profile of the group subscription does not exist in the local cache, the means for transmitting 862 in combination with the means for receiving 832 may act as a means for retrieving for retrieving a profile of the group subscription from a subscriber profile repository. Subsequently, the retrieved profile of the group subscription may be stored in the local cache of the apparatus 802.

If the policy request was received by the means for receiving 832 during an ongoing session or a terminating session, the means for updating 857 may update the profile of the group subscription based on the policy request. In case of terminating sessions, the means for updating 857 may update the profile in the local cache if a session is ongoing for any subscriber belonging to the group subscription. If all sessions belonging to the group subscription have been terminated, then the means for transmitting 862 may provide the function of means for updating and update the profile of the group subscription in a subscriber profile repository.

The present invention provides a system 800 (FIG. 8) comprising the first apparatus 801 and a plurality of second apparatuses 802, described above.

The present invention may further relate to a computer program product. The computer program product may comprise code means for performing the procedures of routing and processing policy request related to group subscription, for example, as described with reference to FIGS. 4-7. Further, the present invention may relate to a computer readable medium embodying the computer program product.

Although the present invention has been described herein before with reference to particular embodiments thereof, the present invention is not limited thereto and various modifications can be made thereto. For example, the present invention can be applied in any networks wherein policy based procedures exist. The present invention can also be extended to systems wherein there may be a plurality of policy enforcement functions (PCEF) handling policy requests for a subscriber and also wherein there may be a plurality of policy request routers. The present invention is applicable also to machine type communication devices wherein a plurality of machines may be part of a group subscription.

The invention claimed is:

1. A method for routing policy requests in a communications network, comprising:

receiving, at a routing agent, a policy request for establishment of a session for a subscriber;

determining, at the routing agent, if the subscriber belongs to a group subscription;

verifying, at the routing agent, if a binding exists between at least one policy engine among a plurality of policy engines and the group subscription, if the subscriber belongs to the group subscription;

updating, at the routing agent, a local cache with a binding between a selected policy engine and the group subscription and selecting any one policy engine among the plurality of policy engines for processing the request, if the result of verification is negative;

creating, at the routing agent, a binding between the selected any one policy engine and the group subscription; and routing the policy request from the routing agent to the at least one policy engine based on the binding for processing the policy request, if the result of verification is positive.

2. The method of claim 1, wherein the determining is based on any of previously provisioned group subscription information and a retrieving of group subscription information.

3. The method of claim 1, wherein the selecting the any one policy engine comprises selecting based on any one of:

load conditions of the plurality of policy engines;

a round-robin selection method; and random selection.

4. A computer program product embodied on a non-transitory computer-readable medium, said computer program product comprising code portions for causing an apparatus on which the computer program product is executed to carry out the method according to claim 1.

5. A method for routing policy requests in a communications network, comprising:

receiving, at a policy engine, a first policy request for initiating a session of a subscriber belonging to a group subscription where a binding exists between the policy engine and the group subscription;

verifying, at the policy engine, if a profile of the group subscription is stored in a local cache;

processing, at the policy engine, the first policy request for the session of the subscriber based on the stored profile, if a profile of the group subscription is stored in the local cache;

receiving, at the policy engine, a second policy request indicating a termination of the session of the subscriber and a quantity of units consumed during a terminating segment of the session;

verifying, at the policy engine, if a session is ongoing for any other subscriber belonging to the group subscription; and updating the profile stored in the local cache based on the quantity of units consumed during the terminating segment of the session, if a session is ongoing for any other subscriber belonging to the group subscription.

6. The method of claim 5 further comprising:

retrieving a profile of the group subscription from a subscriber profile repository if a profile of the group subscription is stored in the local cache; and storing the profile in the local cache.

7. The method of claim 5 further comprising:

sending a message comprising the updated profile to the subscriber profile repository, if a session is ongoing for any other subscriber belonging to the group subscription.

8. An apparatus comprising:

means for receiving, at a routing agent, a policy request for establishment of a session for a subscriber;

means for determining, at the routing agent, if the subscriber belongs to a group subscription;

means for verifying, at the routing agent, if a binding exists between at least one policy engine among a plurality of policy engines and the group subscription, if the subscriber belongs to the group subscription;

means for updating, at the routing agent, a local cache with a binding between a selected policy engine and the group subscription and selecting any one policy engine among the plurality of policy engines for processing the request, if the result of verification is negative;

means for creating, at the routing agent, a binding between the selected any one policy engine and the group subscription; and means for routing the policy request to the at least one policy engine based on the binding for processing the policy request, if the result of verification is positive.

9. An apparatus comprising:

means for receiving, at a policy engine, a first policy request for a session of a subscriber belonging to a group subscription where a binding exists between the policy engine and the group subscription;

means for verifying, at the policy engine, if a profile of the group subscription is stored in a local cache;

means for processing, at the policy engine, the first policy request for the session of the subscriber based on the stored profile, if a profile of the group subscription is stored in the local cache;

means for receiving, at the policy engine, a second policy request indicating a termination of the session of the subscriber and a quantity of units consumed during a terminating segment of the session;

means for verifying, at the policy engine, if a session is ongoing for any other subscriber belonging to the group subscription; and means for updating the profile in the local cache based on the quantity of units consumed during the terminating segment of the session, if a session is ongoing for any other subscriber belonging to the group subscription.

10. The apparatus of claim 9 further comprising:

means for retrieving a profile of the group subscription, if a profile of the group subscription is stored in a local cache.

* * * * *